Aug. 10, 1965  F. R. KRAUSE  3,199,327
MACHINE FOR MAKING SINGLE LEAF SPRINGS AND THE LIKE
Filed May 17, 1961  3 Sheets-Sheet 1

INVENTOR
FRANK R. KRAUSE

BY *Francis J. Klempay*
ATTORNEY

Aug. 10, 1965     F. R. KRAUSE     3,199,327
MACHINE FOR MAKING SINGLE LEAF SPRINGS AND THE LIKE
Filed May 17, 1961     3 Sheets-Sheet 2
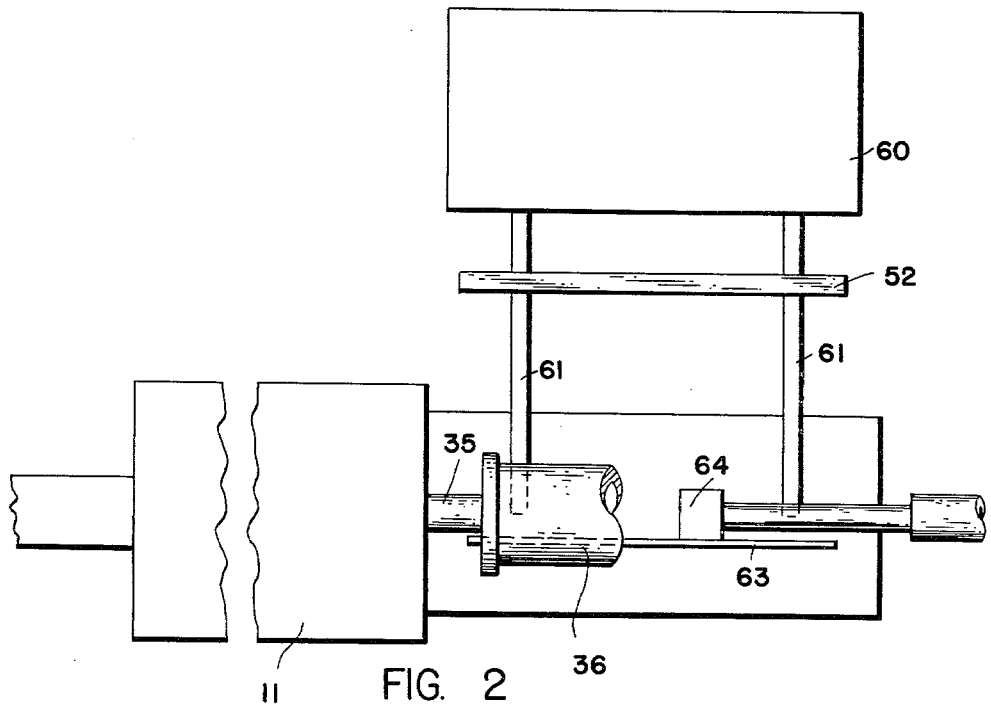
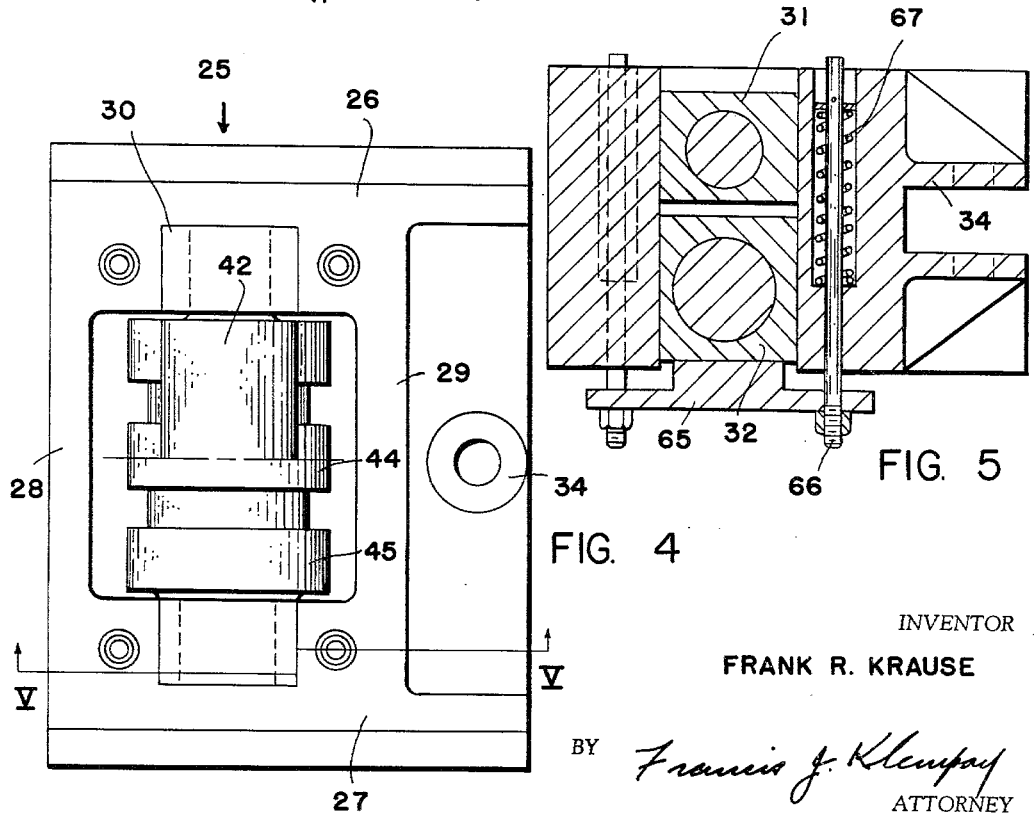
INVENTOR
FRANK R. KRAUSE
BY Francis J. Klempay
ATTORNEY Aug. 10, 1965   F. R. KRAUSE   3,199,327
MACHINE FOR MAKING SINGLE LEAF SPRINGS AND THE LIKE
Filed May 17, 1961   3 Sheets-Sheet 3

INVENTOR
FRANK R. KRAUSE
BY *Francis J. Klempay*
ATTORNEY

United States Patent Office 3,199,327
Patented Aug. 10, 1965

3,199,327
MACHINE FOR MAKING SINGLE LEAF
SPRINGS AND THE LIKE
Frank R. Krause, New Castle, Pa., assignor to Rockwell-Standard Corporation, Pittsburgh, Pa., a corporation of Delaware
Filed May 17, 1961, Ser. No. 110,768
5 Claims. (Cl. 72—215)

This invention relates to apparatus for tapering or varying the thickness of metal bars in the manufacture of leaf springs, for example. It has heretofore been proposed to manufacture leaf springs for motor vehicles from a single steel bar of appropriate analysis wherein the middle portion of the bar is allowed to remain in its original thickness while each end portion is tapered down in thickness toward the ends of the bar. These tapered end portions may or may not be symmetrical, depending on the design of the vehicle suspension system. It is the primary object of the invention to provide apparatus for so tapering the end portions of the spring bars which is simple and compact in design, and wherein the large forces required for the thickness-reducing operation may be created with a minimum of power and restrained in a geometric assembly which is closely interlinked and thus capable of being produced at reasonable cost.

A further object of the invention is the provision of apparatus of the kind outlined above which is capable of a high rate of commercial production of the tapered spring bars at low cost and which may be operated in a semi-automatic manner as regards loading, working, and unloading.

The above and other objects and advantages of the invention will become apparent upon consideration of the following specification and the accompanying drawing wherein there is disclosed a preferred embodiment of the invention.

In the drawing:

FIGURE 2 is a fragmentary plan view of a manufacturing facility utilizing the assembly of FIGURE 1;

FIGURE 4 is a plan view of a carriage assembly used in the apparatus of FIGURE 1;

FIGURE 5 is a sectional view taken along the line V—V of FIGURE 4;

Figure 3:
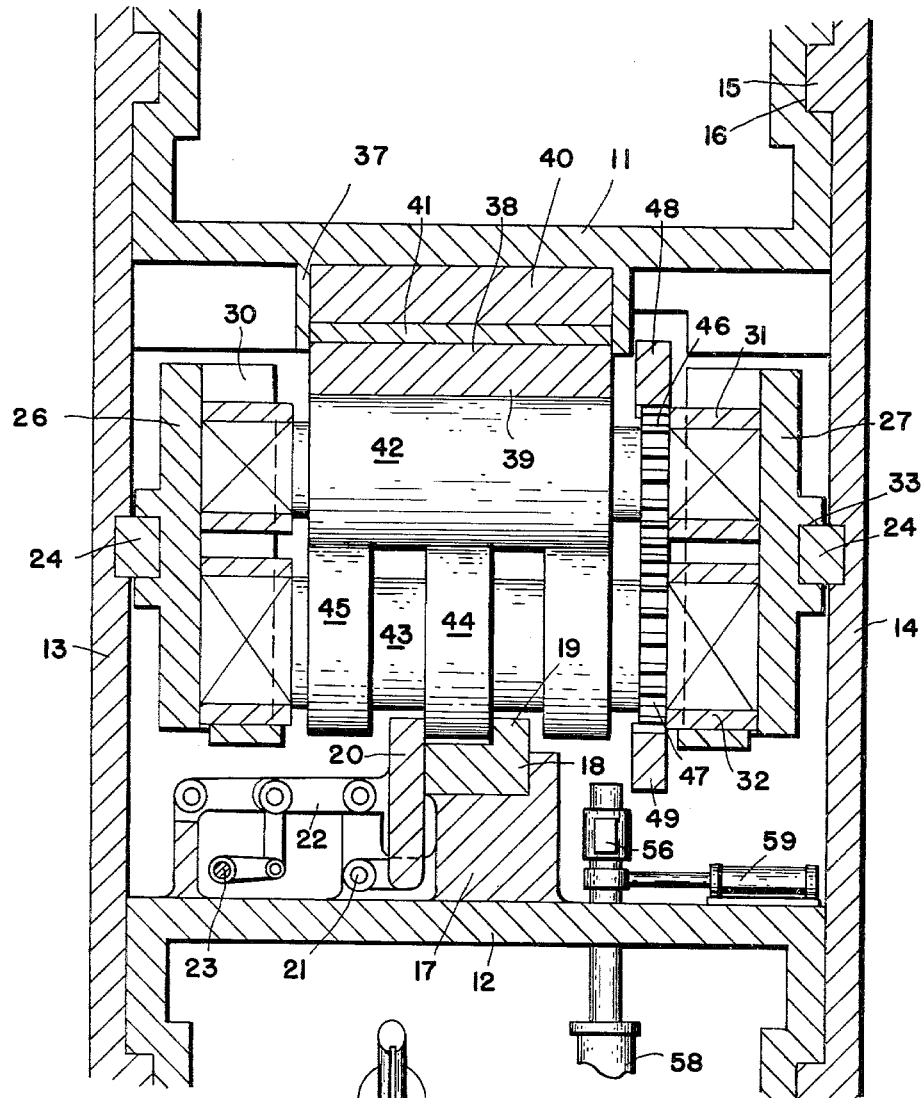
FIGURE 3 is a transverse sectional view taken generally along the line III—III of FIGURE 1.
Figure 6:
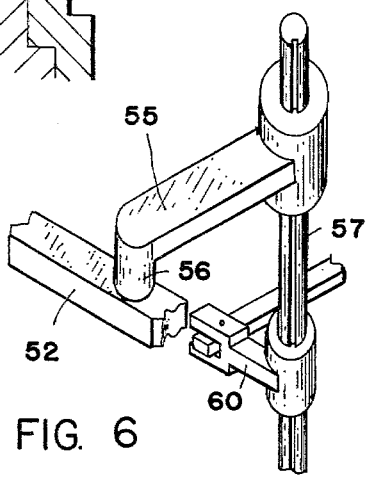
FIGURE 6 is a perspective view of a work clamp which may be used in the apparatus of FIGURE 1.

The apparatus of the invention is assembled in and about a fabricated housing which comprises upper and lower box-like beams 11 and 12, respectively, which are interconnected by side plates 13 and 14. As shown in FIGURE 3, the interconnections between beams 11, 12 and side plates 13, 14 include interlocking rails 15 and slots 16 for purposes of strength and rigidity. Supported longitudinally on the top wall of the beam 12 is a heavy bar 17 which is recessed to receive and support a longitudinally extending die anvil 18. Anvil 18 is formed along one side with an integral or attached flange 19 and is provided along its other side with a retractable flange plate 20 which is pivotally mounted at 21 for swinging movement toward and away from the principal body portion of the die 18. To so move the flange plate 20 I may provide a number of longitudinally spaced toggle assemblies 22 which are arranged to be simultaneously operated by a rock shaft 23. Any suitable means, such as an arm and hydraulic cylinder, not shown, may be employed to rock the shaft 23.

Rigidly secured to the inner faces of the housing side plates 13 and 14 in longitudinal direction but parallel with the elongated die 18 is a pair of rails 24 which forms a track for a slidable carriage now to be described. This carriage has a heavy box-like frame designated generally by the reference numeral 25, which frame may be either cast or suitably fabricated into an integral assembly by welding together suitable steel sections. Frame 25 is first provided with a pair of side sections 26 and 27 which are interconnected by a pair of spaced webs 28 and 29. Within each side section is a vertically disposed and inwardly open slot 30 to floatingly receive an upper bearing chock 31 and lower bearing chock 32. These side sections are further formed on their outer surfaces with longitudinally disposed slots 33 which engage over the rails 24 and thus support the frame assembly 25 for longitudinal sliding movement in the machine assembly. The frame assembly 25 further includes a clevis 34 to which is attached the outer free end of the operating rod 35 of a heavy hydraulic cylinder 36.

Depending from the lower plate or wall of the upper beam 11 is a pair of transversely spaced but longitudinally extending webs 37. Positioned between these webs is a slab 38 having its bottom surface 39 contoured to form a cam complementary to the shape desired to be imparted to the top surface of an elongated workpiece positioned in the die 18. To compensate for wear and for the purpose of making final adjustments the opposite end portions of the cam 38 may be acted on by longitudinally movable wedges 40 which act through an intermediate tapered bolster plate 41. Suitable means, not shown, may be provided to hold the parts 38, 40 and 41 in upper position while yet allowing the downward movement of the parts 38 and 41 by the wedges 40.

Journaled within the upper chocks 31 of the carriage assembly is a pressure-transferring roll 42 which, as shown in FIGURE 3, is normally in rolling contact with the cam surface 39. Journaled within the lower chocks 32 is a roll 43 having a centrally disposed working portion 44 sized to fit snugly within the die 18 and spaced end portions 45 adapted to transmit pressure from the roll 42. Of course, the work portion 44 of the roll 43 also has rolling contact with the roll 42. Portions 44 and 45 of roll 43 are spaced by necked-down portions to clear the flanges 19 and 20 of the die 18. Rolls 42 and 43 are provided with spur gears 46 and 47, respectively, which intermesh, as shown in FIGURE 3, and which in turn mesh with rack gears 48 and 49, respectively. These rack gears are pivotally mounted at one end as at 50 and are biased inwardly toward each other at their other end by the tension springs 51. The purpose of this arrangement is to insure that the teeth on the racks 48 and 49 are always in mesh with the gears 46 and 47 regardless of the floating vertical position of the axes of the rolls 42 and 43. In actual practice the pitch diameters of the spur gears 46 and 47 should be exactly equal to the outer diameters of the rolls 42 and 43 so that no slippage will occur between the cam surface 39 and the roll 42, between the roll 42 and the roll 43, and between the work portion 44 of the roll 43 and the workpiece within the die 18. Also in this manner upon the carriage 25 being forceably moved longitudinally by the cylinder 36 the rolls will be positively rotated in pure rolling contact with the cam, between each other, and with the workpiece, and as a consequence maximum reduction in thickness of the workpiece may be effected in one pass without marking of any of the rolls. This arrangement is further advantageous at the start of the rolling of a workpiece as will be evident upon consideration of FIGURE 7 wherein the workpiece is shown in the form of a bar at 52 and wherein an end portion of the anvil 18 is shown. Preferably this end portion of the anvil 18 is stepped on its bottom wall as shown at 53 at a location in relation to the workpiece that an extreme end portion of the workpiece is cantilevered out over the formed shoulder.

Figure 1:
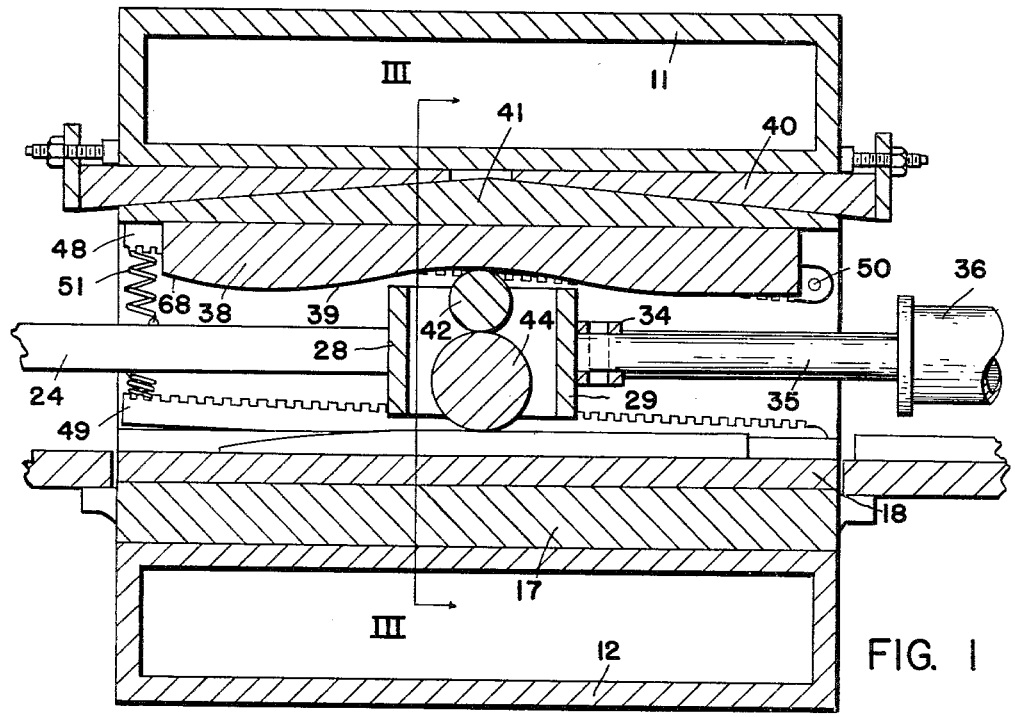
FIGURE 1 is a fragmentary longitudinal section of rolling apparatus constructed in accordance with the principles of the invention.
Figures 7, 8:
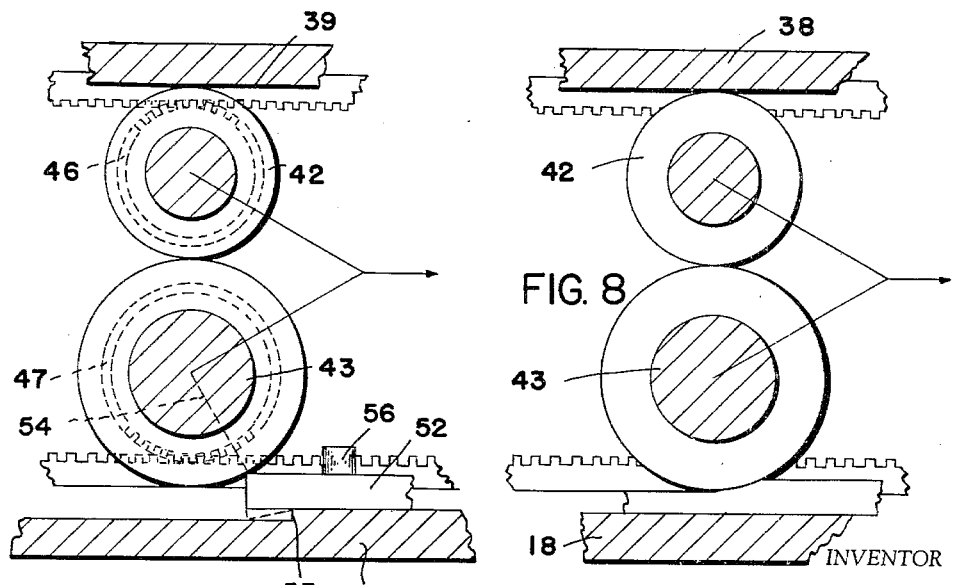
FIGURES 7 and 8 are fragmentary views illustrating principles of operation of the apparatus.

During the loading of the workipece the work roll is positioned to the left, as shown in FIGURE 7, and this work roll may of itself serve as a stop to limit the inward sliding movement of the blank. After the workpiece is suitably clamped, by apparatus to be hereinafter described, the cylinder 36 is actuated to begin movement of the work roll 43 to the right as viewed in FIGURE 7. First, the end extremity of the blank is bent down, as indicated, over the sharp edge of the shoulder 53 and the blank is thus locked against longitudinal sliding movement. At this time and because of the above recited gearing a bell crank lever action represented by the arm 54 is exerted in a direction to greatly reduce the thickness of the workpiece 52 while requiring a minimum of pulling force by the cylinder 36.

The above described lever-like action of the reducing roll 44 is particularly highly advantageous when rolling single leaf springs since in this product the greatest reduction is taken at the extreme ends of the workpiece with normally no reduction being taken in the center portion of the workpiece. The apparatus of my invention, particularly its ability to effect very large reduction and thickness of the extreme end portion of the workpiece, enables such springs to be rolled in one pass with the consequent very low cost of production.

Referring now to the workpiece clamping device mentioned above this may comprise an arm 55 having a depending free end portion 56 for engaging the top of the workpiece 52 and which is rigidly mounted on a vertically journaled shaft 57. Shaft 57 is arranged to be raised and lowered by a cylinder 58 and to be rotated by a cylinder 59 which is connected to the shaft through a lever 60 having a spined connection with the shaft. Suitable automatically controlled sequence valves, not shown, are provided to raise the shaft 57 and arm 55 and to immediately thereafter swing the arm 55, 56 across the die flange 19 after the roll 43 has moved to its left position as shown in FIGURE 7. As soon as the workpiece 52 is in position these valves reactivate the cylinder 58 in the opposite direction so that the arm portion 56 will clamp the workpiece. At the start of rolling, clamp arm 55, 56 is automatically released, swung over the flange 19 and retracted as soon as the work roll has locked the workpiece in place as described above.

In a representative plant installation of the apparatus of my invention as shown in FIGURE 2, there may be included a heating furnace 60 from which the bars of workpieces 52 descend by suitable transfer mechanism, not shown, along the rails 61. The bars 52 arrive in sequence against a back stop 63 along which they are moved by an hydraulic cylinder actuated pusher 64 longitudinally into the die 18—pushing the previously rolled workpiece longitudinally out of the die. At this time the flange plate 20 is released (opened) to provide sufficient clearance for the easy sliding movement of the workpieces in the die, and the work rolls are retracted to the left of the assembly as shown in FIGURE 7. Means are provided, as shown in FIGURES 4 and 5 in the form of the lift members 65, lift rods 66 and compression springs 67, to hold the rolls in upper position against the cam. The cam 38 is contoured upwardly as shown at 68 sufficient distance to allow the work roll 43 to be lifted free and clear of the top of the workpiece as the same is slid out of the die 18.

It should now be apparent that I have devised improved apparatus for tapering leaf springs and the like which accomplishes the objects initially set out. The apparatus is simple and compact and is so arranged that the large forces resulting reactively from the rolling pressure are efficiently contained within a relatively small tubular-like housing which enables the machine to be of minimum size and weight and thus inexpensive. The rolling or reducing action is most efficient to the extent that the required tapering may be accomplished in a single pass whereby a high rate of production may be achieved with a single machine and whereby the machine is not required to be provided with any means for resetting the rolls or the die between successive passes as would be required if a plurality of passes were required to produce a product.

In addition to the above outlined advantage of lack of slippage, the interconnected gearing between the rolls and between the upper and lower racks 48 and 49 is further advantageous in the following two respects. First, this arrangement insures that the two rolls employed are always vertically aligned so that there is no tendency for the roll assembly or for the carriage 25 itself to overturn about any transverse horizontal axis even when the lower work roll encounters the resistance of the workpiece while the drawing force applied by the cylinder rod 35 is being applied in offset relation. There is thus avoided any necessity for accurately or forceably guiding the carriage and the mechanism may remain simple in design. Secondly, the absence of any such overturning tendency minimizes friction between the guide bars 24 and the carriage and keeps the motive power required to a minimum.

While I have illustrated and described a machine in which the work blanks are always fed in from one end and the rolling is always effected in the same direction of movement of the rolling carriage it should be obvious that through the use of suitable loading and unloading equipment and the placement of shoulders (53) at both ends of the die as well as suitable modification of the cam 38 a procedure may be established wherein successive workpieces may be rolled in successive back and forth strokes of the rolling carriage.

In view of the above it should be apparent that the herein specifically described embodiment of the invention should be considered as illustrative only. Many changes may be made without departing from the spirit or scope of the invention, and reference should be had to the appended claims in determining the scope of the invention.

I claim:

1. Apparatus for tapering the end portions of a metal bar comprising a rigid housing having an elongated opening therethrough, an elongated anvil adapted to receive a metal bar blank extending longitudinally in said opening and supported on a side wall thereof, a carriage slidably received in said opening and guided for longitudinal movement therein, an elongated cam extending longitudinally in said opening and supported on a side wall thereof opposite said anvil, a cam-following roll for engaging said cam and floatingly journaled in said carriage for movement toward and away from said anvil upon longitudinal movement of said carriage as may be required by the undulations of said cam, a working roll positioned between said cam-following roll and said anvil and floatingly mounted in said carriage whereby the forces transmitted by said cam-following roll upon longitudinal movement of said carriage may be transmitted to the blank on said anvil to reduce the thickness of said blank, power means to move said carriage longitudinally, a gear on each of said cam-following and working rolls having pitch diameters corresponding to the diameters of said rolls, and gear racks meshing with said first mentioned gears and extending longitudinally in said opening but held therein against longitudinal movement, said gear racks being flotingly mounted in said opening and urged into continuous contact with said first mentioned gears whereby both said rolls will be forced to rotate upon longitudinal movement of said carriage throughout the whole extent of said cam.

2. Apparatus according to claim 1 further characterized in that said first mentioned gears are intermeshed with each other whereby the plane of the axes of said rolls and the alignment of said carriage in a plane transverse of said opening will be maintained constant without the aid of said means to guide said carriage.

3. Apparatus for tapering the end portions of metal bars comprising an elongated channel-shaped anvil, means to guide and move a bar blank longitudinally into said anvil, a work roll having a working face to fit within said anvil and guided for rolling movement longitudinally of said anvil and in contact with the blank positioned in said anvil, an elongated cam fixed in spaced parallel relation to said anvil, a cam-following roll interposed between said cam and said work roll and in contact with both and operative to transmit the undulations of said cam onto the blank to vary the thickness thereof in correspondence with the shape of the cam, power means to move said rolls longitudinally along said cam and anvil, one of the flanges of said channel-shaped anvil being movable with respect to the base and the other flange of said anvil, and power means to move said movable flange toward and away from said base and other flange, the arrangement being such that after rolling of a blank said flanges may be separated to facilitate the unloading thereof and the reloading of a next succeeding blank.

4. Metal rolling apparatus comprising a rigid housing having an elongated and horizontally disposed opening therethrough, longitudinally extending and parallel guide rails on either side of said opening, an elongated anvil supported on the bottom wall of said opening intermediate of and generally parallel with said guide rails, an elongated cam mounted on the top wall of said opening in parallel relation to said rails and anvil, a carriage slidable on said rails, power means to move said carriage longitudinally in said opening, said carriage comprising a box-like structure having a vertical window therethrough and a vertically disposed slot in each of its side walls, bearing chocks slidably mounted in said slots, transversely extending but vertically aligned and interengaging cam-following and work rolls journaled in said chocks, gears on said rolls having pitch diameters equal to the diameters of said rolls, and gear racks extending longitudinally in said opening but held against longitudinal movement for meshing with said first mentioned gears whereby said rolls will be forced to rotate during longitudinal movement of said carriage.

5. Metal rolling apparatus comprising a rolling mill having a housing with an elongated opening therein, a channel-shaped anvil die positioned longitudinally in said opening, a carriage mounting a work roll slidably mounted for longitudinal movement in said opening, power means to reciprocate said carriage, cam means extending longitudinally in said opening to force said work roll down onto a bar positioned in said die whereby the thickness of said bar will be varied according to a predetermined pattern, means to retract said work roll from said bar, means positioned outwardly of one end of said opening to slide a succeeding bar blank into said die longitudinally while ejecting a previously rolled bar longitudinally out of said die, said die being formed with at least one movable side flange, and means to move said movable side flange toward and away from the opposite side flange of the die to facilitate the loading and unloading of the die.

References Cited by the Examiner
UNITED STATES PATENTS

| 6,332 | 1/31 | Stoudinger | 80—19 |
| 9,471 | 12/52 | Field | 80—29 |
| 149,544 | 4/74 | Tay | 80—19 |
| 531,042 | 12/94 | Johnston | 80—31.1 |
| 1,113,189 | 10/14 | Bradford | 80—56 |
| 1,633,970 | 6/27 | Ball | 78—18 |
| 2,027,293 | 1/36 | Seiferth | 80—60 |
| 2,775,152 | 12/56 | Krause | 80—40 |

FOREIGN PATENTS 375,656   6/32   Great Britain.

OTHER REFERENCES

Platzer (Germany), application No. P 77,131, May 17, 1956.

CHARLES W. LANHAM, Primary Examiner.

LEON PEAR, Examiner.